United States Patent
Wang et al.

(10) Patent No.: US 10,218,592 B2
(45) Date of Patent: Feb. 26, 2019

(54) METHOD, DEVICE AND SYSTEM FOR PERFORMING BIDIRECTIONAL FORWARDING DETECTION ON AGGREGATED LINK

(71) Applicant: Huawei Technologies Co., Ltd., Shenzhen (CN)

(72) Inventors: Zuliang Wang, Beijing (CN); Xudong Zhang, Beijing (CN); Yu Liu, Beijing (CN); Rui Duan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 15/639,761

(22) Filed: Jun. 30, 2017

(65) Prior Publication Data
US 2017/0302547 A1  Oct. 19, 2017

Related U.S. Application Data

(63) Continuation of application No. PCT/CN2014/096053, filed on Dec. 31, 2014.

(51) Int. Cl.
*H04L 12/26* (2006.01)
*H04L 12/707* (2013.01)
(Continued)

(52) U.S. Cl.
CPC .......... *H04L 43/0823* (2013.01); *H04L 43/12* (2013.01); *H04L 45/22* (2013.01);
(Continued)

(58) Field of Classification Search
CPC ..... H04L 43/0823; H04L 45/28; H04L 45/24; H04L 43/12; H04L 45/22; H04L 45/50; H04L 43/0811; H04L 45/245
See application file for complete search history.

(56) References Cited

U.S. PATENT DOCUMENTS

| | | |
|---|---|---|
| 2007/0207591 A1 | 9/2007 | Rahman et al. |
| 2009/0010171 A1 | 1/2009 | Gupta et al. |
| | (Continued) | |

FOREIGN PATENT DOCUMENTS

| | | |
|---|---|---|
| CN | 101826983 A | 9/2010 |
| CN | 102299846 A | 12/2011 |
| CN | 103248567 A | 8/2013 |

OTHER PUBLICATIONS

Machine Translation and Abstract of Chinese Publication No. CN102299846, Dec. 28, 2011, 12 pages.
(Continued)

*Primary Examiner* — Walli Z Butt
(74) *Attorney, Agent, or Firm* — Conley Rose, P.C.

(57) ABSTRACT

A method for performing bidirectional forwarding detection (BFD) on an aggregated link between a first network device and a second network device, where the first network device sends, to the second network device, information used to establish at least two BFD sessions. The first network device receives information that is used to establish at least two BFD sessions and sent by the second network device. The first network device respectively establishes BFD sessions between at least two pairs of ports according to the stored information and the information sent by the second network device. The first network device determines whether at least one BFD session in the established BFD sessions is up. If at least one BFD session in the established BFD sessions is up, the first network device determines that the aggregated link between the first network device and the second network device is available.

20 Claims, 17 Drawing Sheets

(51) Int. Cl.
*H04L 12/703* (2013.01)
*H04L 12/709* (2013.01)
*H04L 12/723* (2013.01)

(52) U.S. Cl.
CPC .............. *H04L 45/24* (2013.01); *H04L 45/28* (2013.01); *H04L 43/0811* (2013.01); *H04L 45/245* (2013.01); *H04L 45/50* (2013.01)

(56) References Cited

U.S. PATENT DOCUMENTS

| | | | | |
|---|---|---|---|---|
| 2009/0323520 | A1* | 12/2009 | Kapoor | H04L 41/0681 370/225 |
| 2012/0281541 | A1* | 11/2012 | Palmer | H04L 45/245 370/241 |
| 2013/0021903 | A1 | 1/2013 | Li | |
| 2014/0019614 | A1* | 1/2014 | Rahman | H04L 45/00 709/224 |
| 2014/0301404 | A1 | 10/2014 | Zheng et al. | |
| 2015/0188814 | A1* | 7/2015 | Jain | H04L 45/74 370/392 |
| 2015/0236920 | A1* | 8/2015 | Bevilacqua | H04L 43/0811 709/224 |
| 2015/0381324 | A1* | 12/2015 | Mirsky | H04L 1/24 370/241.1 |

OTHER PUBLICATIONS

Machine Translation and Abstract of Chinese Publication No. CN103248567, Aug. 14, 2013, 11 pages.
Katz, D., "Bidirectional FOrwarding Detection (BFD)," XP015070820, RFC 5880, Jun. 2010, 50 pages.
Foreign Communication From a Counterpart Application, European Application No. 14909550.7, Extended European Search Report dated Sep. 1, 2017, 8 pages.
Foreign Communication From a Counterpart Application, PCT Application No. PCT/CN2014/096053, English Translation of International Search Report dated Apr. 29, 2015, 2 pages.
Foreign Communication From a Counterpart Application, PCT Application No. PCT/CN2014/096053, English Translation of Written Opinion dated Apr. 29, 2015, 7 pages.

* cited by examiner

| | 1 | | | | | | | | 2 | | | | | | | | 3 | | | | | | | | 4 | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| Vers | | | | A | S/M | P | F | H | | | Reserved | | | | | | | | Return code | | | | | | | | | | | | |
| Trans Num | | | | | | | | | | | | | | | | | | | | | | | | | | | | | | | |
| Seq Num | | | | | | | | | | | | | | | | | | | | | | | | | | | | | | | |
| PDU type | | | | | | | | | | | | | | | | PDU length | | | | | | | | | | | | | | | |
| Context (sub-type-value) | | | | | | | | | | | | | | | | | | | | | | | | | | | | | | | |

| Sub-TLV-type=Local App Info for IPv4 | Length |
|---|---|
| Local address ||
| Source port | Dest port |
| Local protocol Num | Reserved |

| Sub-TLV-type=Remote App Info for IPv4 | Length |
|---|---|
| Remote address ||
| Source port | Dest port |
| Remote protocol Num | Reserved |

FIG. 3C

| | 1 | | | | | | | | 2 | | | | | | | | 3 | | | | | | | | 4 | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| Vers | | | | A | S/M | P | F | H | Reserved | | | | | | | | Return code | | | | | | | | | | | | | | |
| Trans Num |||||||||||||||||||||||||||||||||
| Seq Num |||||||||||||||||||||||||||||||||
| PDU type=Sub session map |||||||||||||||| PDU length ||||||||||||||||
| Local discriminator |||||||||||||||||||||||||||||||||
| Sub-TLV-type=Local App Info for IPv4 |||||||||||||||| Length ||||||||||||||||
| Local address |||||||||||||||||||||||||||||||||
| Source port |||||||||||||||| Dest port ||||||||||||||||
| Local protocol Num |||||||||||||||| Reserved ||||||||||||||||
| Sub-TLV-type=Remote App Info for IPv4 |||||||||||||||| Length ||||||||||||||||
| Remote address |||||||||||||||||||||||||||||||||
| Source port |||||||||||||||| Dest port ||||||||||||||||
| Remote protocol Num |||||||||||||||| Reserved ||||||||||||||||
| Sub-TLV-type=Local sub session Info |||||||||||||||| Length ||||||||||||||||
| Local session ID |||||||||||||||||||||||||||||||||
| End-TLV |||||||||||||||||||||||||||||||||

FIG. 3D

| | 1 | | | | | | | | 2 | | | | | | | | 3 | | | | | | | | 4 | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| Vers | | | | A | S/M | P | F | H | Reserved | | | | | | | Return code | | | | | | | | | | | | | | | |

| Trans Num |
|---|
| Seq Num |

| PDU type=Sub session map | PDU length |
|---|---|
| Local discriminator (discriminator of port 130-1) | |
| Sub-TLV-type=Local App Info for IPv4 | Length |
| Local address | |
| Source port | Dest port |
| Local protocol Num | Reserved |
| Sub-TLV-type=Remote App Info for IPv4 | Length |
| Remote address | |
| Source port | Dest port |
| Remote protocol Num | Reserved |
| Sub-TLV-type=Local Sub session Info | Length |
| Local session ID (session identifier associated with discriminator of port 130-1) | |
| Local discriminator (discriminator of port 130-2) | |
| Sub-TLV-type=Local Sub session Info | Length |
| Local session ID (session identifier associated with discriminator of port 130-2) | |
| End-TLV | |

FIG. 3E

| Sub-TLV-type=Local App Info for IPv6 | Length |
|---|---|
| Local address ||
| Source port | Dest port |
| Local protocol Num | Reserved |

| Sub-TLV-type=Remote App Info for IPv6 | Length |
|---|---|
| Remote address ||
| Source Port | Dest Port |
| Remote protocol Num | Reserved |

FIG. 3F

| Sub-TLV-type=Local App Info for IPv4 | Length |
|---|---|
| Local address ||
| Source port | Dest port |
| Local protocol Num | Reserved |

| Sub-TLV-type=Remote App Info for LDP | Length |
|---|---|
| Remote address ||
| Prefix-length | Reserved |

FIG. 3G

| Sub-TLV-type=Local App Info for IPv6 | Length |
|---|---|
| Local address ||
| Source port | Dest port |
| Local protocol Num | Reserved |

| Sub-TLV-type=Remote App Info for LDP | Length |
|---|---|
| Remote address ||
| Prefix-length | Reserved |

FIG. 3H

| Sub-TLV-type=Local App Info for IPv4 | Length |
|---|---|
| Local address ||
| Source port | Dest port |
| Local protocol Num | Reserved |

| Sub-TLV-type=Remote App Info for LDPv6 | Length |
|---|---|
| Remote address ||
| Prefix-length | Reserved |

FIG. 3I

| Sub-TLV-type=Local App Info for IPv6 | Length |
|---|---|
| Local address ||
| Source port | Dest port |
| Local protocol Num | Reserved |

| Sub-TLV-type=Remote App Info for LDPv6 | Length |
|---|---|
| Remote address ||
| Prefix-length | Reserved |

FIG. 3J

| Sub-TLV-type=Local App Info for RSVP | Length |
|---|---|
| End point address ||
| LSP ID | Tunnel ID |
| Extended tunnel ID ||
| Sender address ||
| Mode=Remote TLV type (LSP) | Reserved |

| Sub-TLV-type=Remote App Info for RSVP | Length |
|---|---|
| End point address ||
| LSP ID | Tunnel ID |
| Extended tunnel ID ||
| Sender address ||
| Mode=Remote TLV type (LSP) | Reserved |

FIG. 3K

| Sub-TLV-type=Local App Info for IPv4 | Length |
|---|---|
| Local address ||
| Source port | Dest port |
| Local protocol Num | Reserved |

| Sub-TLV-type=Remote App Info for RSVP | Length |
|---|---|
| End point address ||
| LSP ID | Tunnel ID |
| Extended tunnel ID ||
| Sender address ||
| Mode=Remote TLV type(IP) | Reserved |

FIG. 3L

| Sub-TLV-type=Local App Info for RSVPv6 | Length |
|---|---|
| End point address | |
| LSP ID | Tunnel ID |
| Extended tunnel ID | |
| Sender address | |
| Mode=Remote TLV type (LSP) | Reserved |

| Sub-TLV-type=Remote App Info for RSVPV6 | Length |
|---|---|
| End point address | |
| LSP ID | Tunnel ID |
| Extended tunnel ID | |
| Sender address | |
| Mode=Remote TLV type (LSP) | Reserved |

FIG. 3M

| Sub-TLV-type=Local App Info for IPv6 | Length |
|---|---|
| Local address ||
| Source port | Dest port |
| Local protocol Num | Reserved |

| Sub-TLV-type=Remote App Info for RSVPv6 | Length |
|---|---|
| End point address ||
| LSP ID | Tunnel ID |
| Extended tunnel ID ||
| Sender address ||
| Mode=Remote TLV type (IP) | Reserved |

FIG. 3N

| Sub-TLV-type=Local App Info for FEC128 | Length |
|---|---|
| Local LSR ID ||
| Local PW ID | Local PW type |

| Sub-TLV-type=Remote App Info for FEC128 | Length |
|---|---|
| Remote LSR ID ||
| Remote PW ID | Remote PW type |

FIG. 3O

| Sub-TLV-type=Local App Info for FEC129 | | Length | |
|---|---|---|---|
| Local LSR ID | | | |
| Local PW type | | AGI type | AGI length |
| AGI value | | | |
| AII type | AII length | AII value | |
| AII value | | | |

| Sub-TLV-type=Remote App Info for FEC129 | | Length | |
|---|---|---|---|
| Remote LSR ID | | | |
| Remote PW type | | AGI type | AGI length |
| AGI value | | | |
| AII type | AII length | AII value | |
| AII value | | | |

FIG. 3P

METHOD, DEVICE AND SYSTEM FOR PERFORMING BIDIRECTIONAL FORWARDING DETECTION ON AGGREGATED LINK

CROSS-REFERENCE TO RELATED APPLICATION

This application is a continuation of International Patent Application No. PCT/CN2014/096053, filed on Dec. 31, 2014, the disclosure of which is hereby incorporated by reference in its entirety.

TECHNICAL FIELD

Embodiments of the present disclosure relate to the communications field, and in particular, to a method, device and a system for performing bidirectional forwarding detection on an aggregated link.

BACKGROUND

In a network system including network devices, for example, a multiprotocol label switching (MPLS) network or an Internet Protocol (IP) network, a link aggregation (LAG) technology may be used for the network devices to improve reliability. Link aggregation refers to logically combining at least two single links into one aggregated link. A bandwidth of an aggregated link is equal to a sum of bandwidths of multiple links included in the aggregated link. Therefore, performance of the aggregated link is better, and load sharing may be performed between different links in the aggregated link. When one or more links in the aggregated link are faulty, communication between devices coupled using the aggregated link is not interrupted.

In the prior art, fault detection is performed on an aggregated link using bidirectional forwarding detection (BFD). The BFD can be used to detect whether a path between two network devices is faulty, including whether a port is faulty, whether a link is faulty, whether the network devices are faulty, and the like. When only one BFD session is used to detect whether the aggregated link is faulty, a misjudgment easily occurs.

SUMMARY

According to a first aspect, an embodiment of the present disclosure provides a method for performing detection on an aggregated link between a first network device and a second network device. The aggregated link exists between a first aggregated port of the first network device and a second aggregated port of the second network device. The first aggregated port includes a first port and a second port. The second aggregated port includes a third port and a fourth port. The first network device sends, to the second network device, information used to establish at least two BFD sessions. The information includes information about the first aggregated port, information about the second aggregated port, an identifier of the first port, a session identifier associated with the identifier of the first port, an identifier of the second port, and a session identifier associated with the identifier of the second port. The session identifier associated with the identifier of the first port is used to identify a BFD session that is to be established on the first port. The session identifier associated with the identifier of the second port is used to identify a BFD session that is to be established on the second port. The first network device stores the information that is used to establish the at least two BFD sessions and sent to the second network device. The first network device receives information that is used to establish at least two BFD sessions and sent by the second network device. The information sent by the second network device includes the information about the second aggregated port, the information about the first aggregated port, an identifier of the third port, a session identifier associated with the identifier of the third port, an identifier of the fourth port, and a session identifier associated with the identifier of the fourth port. The session identifier associated with the identifier of the third port is the same as the session identifier associated with the identifier of the first port. The session identifier associated with the identifier of the fourth port is the same as the session identifier associated with the identifier of the second port. The session identifier associated with the identifier of the third port is used to identify a BFD session that is to be established on the third port. The session identifier associated with the identifier of the fourth port is used to identify a BFD session that is to be established on the fourth port. The first network device establishes a BFD session between the first port and the third port and a BFD session between the second port and the fourth port according to the stored information and the information sent by the second network device. The first network device determines whether at least one BFD session in the established BFD sessions is up. If at least one BFD session in the established BFD sessions is up, the first network device determines that the aggregated link is available.

Optionally, the information sent by the first network device to the second network device may be generated by the first network device, or may be manually preconfigured. The first network device and the second network device each are one of the following types of network devices: a router, a switch, a stackable switch, a bridge, a gateway, and a virtual network device. The first port may be a physical port or a logical port. The second port may be a physical port or a logical port. The third port may be a physical port or a logical port. The fourth port may be a physical port or a logical port. A link in the aggregated link may be physical or logical. Both the identifier of the first port and the identifier of the second port may be discriminators of the ports of the first network device, and the discriminator is used by the first network device to uniquely identify a local port. Both the identifier of the third port and the identifier of the fourth port may be discriminators of the ports of the second network device, and the discriminator is used by the second network device to uniquely identify a local port. That the BFD session is up indicates that the BFD session is successfully established and that a connection between the first network device and the second network device is working.

According to the first aspect, a first implementation manner is provided. The information about the first aggregated port includes a source port number, a destination port number, a protocol number, and an IP address of the first aggregated port. The information about the second aggregated port includes an IP address of the second aggregated port.

Optionally, the IP address of the first aggregated port may be an Internet Protocol version 4 (IPv4) address, and it indicates that the to-be-established BFD sessions are used to detect an IPv4-based application on the aggregated link in a direction from the first aggregated port to the second aggregated port. The IP address of the first aggregated port may be an IPv6 address, and it indicates that the to-be-established BFD sessions are used to detect an application that is based on Internet Protocol version 6 (IPv6) and that is on the aggregated link in a direction from the first aggregated port to the second aggregated port. The IP address of the second aggregated port may be an IPv4 address, and it indicates that the to-be-established BFD sessions are used to detect a Label Distribution Protocol (LDP) label switched path (LSP) on the aggregated link in the direction from the second aggregated port to the first aggregated port. The IP address of the second aggregated port may be an IPv6 address, and it indicates that the to-be-established BFD sessions are used to detect a Label Distribution Protocol for IPv6 (LDPv6) LSP on the aggregated link in the direction from the second aggregated port to the first aggregated port.

Optionally, if all the source port number, the destination port number, and the protocol number are 0, it indicates that the to-be-established BFD sessions are used to detect all IPv4-based applications on the aggregated link in a direction from the first aggregated port to the second aggregated port. If both the source port number and the destination port number are 0, and the protocol number is 89, it indicates that the to-be-established BFD sessions are used to detect an application that uses Open Shortest Path First (OSPF) and that is on the aggregated link in a direction from the first aggregated port to the second aggregated port. For another example, if the source port number is 0, the destination port number is 520, and the protocol number is 17, it indicates that the to-be-established BFD sessions are used to detect an application that uses the Routing Information Protocol (RIP) and that is on the aggregated link in a direction from the first aggregated port to the second aggregated port.

According to the first aspect, a second implementation manner is provided. The information about the first aggregated port includes a source port number, a destination port number, a protocol number, and an IP address of the first aggregated port. The information about the second aggregated port includes a source port number, a destination port number, a protocol number, and an IP address of the second aggregated port.

Optionally, if all the source port number, the destination port number, and the protocol number in the information about the first aggregated port are 0, and all the source port number, the destination port number, and the protocol number in the information about the second aggregated port are 0, it indicates that the to-be-established BFD sessions are used to detect all IP-based applications on the aggregated link.

Optionally, if in the information about the first aggregated port, both the source port number and the destination port number are 0, and the protocol number is 89, and in the information about the second aggregated port, both the source port number and the destination port number are 0, and the protocol number is 89, it indicates that the to-be-established BFD sessions are used to detect an application that uses OSPF and that is on the aggregated link.

Optionally, if in the information about the first aggregated port, the source port number is 0, the destination port number is 520, and the protocol number is 17, and in the information about the second aggregated port, the source port number is 0, the destination port number is 520, and the protocol number is 17, it indicates that the to-be-established BFD sessions are used to detect an application that uses the RIP and that is on the aggregated link.

According to the first aspect, a third implementation manner is provided. The information about the first aggregated port includes a loopback address of the second network device, a unidirectional label switched path identifier of a unidirectional label switched path from the first aggregated port to the second aggregated port, a unidirectional tunnel identifier of a unidirectional tunnel from the first aggregated port to the second aggregated port, and a loopback address of the first network device. The information about the second aggregated port includes the loopback address of the first network device, a unidirectional label switched path identifier of a unidirectional label switched path from the second aggregated port to the first aggregated port, a unidirectional tunnel identifier of a unidirectional tunnel from the second aggregated port to the first aggregated port, and the loopback address of the second network device.

Optionally, both the loopback address of the first network device and the loopback address of the second network device are IPv4 addresses. The information indicates that the to-be-established BFD sessions are used to detect an application that is based on the Resource Reservation Protocol (RSVP) and that is on the aggregated link in a direction from the first aggregated port to the second aggregated port, and to detect an RSVP-based application on the aggregated link in a direction from the second aggregated port to the first aggregated port.

Optionally, both the loopback address of the first network device and the loopback address of the second network device are IPv6 addresses. The information indicates that the to-be-established BFD sessions are used to detect an application that is based on RSVP for IPv6 (RSVPv6) and that is on the aggregated link in a direction from the first aggregated port to the second aggregated port, and to detect an RSVPv6-based application on the aggregated link in a direction from the second aggregated port to the first aggregated port.

According to the first aspect, a fourth implementation manner is provided. The information about the first aggregated port includes an IPv4 address of the first network device and an identifier and a type of a pseudo wire between the first aggregated port and the second aggregated port. The information about the second aggregated port includes an IPv4 address of the second network device and an identifier and a type of a pseudo wire between the second aggregated port and the first aggregated port. The information indicates that the to-be-established BFD sessions are used to detect an application that is based on forwarding equivalence class (FEC) 128 and that is on the aggregated link in a direction from the first aggregated port to the second aggregated port, and to detect an FEC 128-based application on the aggregated link in a direction from the second aggregated port to the first aggregated port.

According to a second aspect, an embodiment of the present disclosure provides a network device, and the network device is a first network device. An aggregated link exists between a first aggregated port of the first network device and a second aggregated port of a second network device. The first aggregated port includes a first port and a second port. The second aggregated port includes a third port and a fourth port. The first network device includes a sending and receiving unit, a processing unit, and a storage unit. The sending and receiving unit is configured to send, to the second network device, information used to establish at least two BFD sessions. The information includes information about the first aggregated port, information about the second aggregated port, an identifier of the first port, a session identifier associated with the identifier of the first port, an identifier of the second port, and a session identifier associated with the identifier of the second port. The session identifier associated with the identifier of the first port is used to identify a BFD session that is to be established on the first port. The session identifier associated with the identifier of the second port is used to identify a BFD session that is to be established on the second port. The storage unit is configured to store the information that is used to establish the at least two BFD sessions and sent to the second network device. The sending and receiving unit is further configured to receive information that is used to establish at least two BFD sessions and sent by the second network device. The information sent by the second network device includes the information about the second aggregated port, the information about the first aggregated port, an identifier of the third port, a session identifier associated with the identifier of the third port, an identifier of the fourth port, and a session identifier associated with the identifier of the fourth port. The session identifier associated with the identifier of the third port is the same as the session identifier associated with the identifier of the first port. The session identifier associated with the identifier of the fourth port is the same as the session identifier associated with the identifier of the second port. The session identifier associated with the identifier of the third port is used to identify a BFD session that is to be established on the third port. The session identifier associated with the identifier of the fourth port is used to identify a BFD session that is to be established on the fourth port. The processing unit is configured to establish a BFD session between the first port and the third port and a BFD session between the second port and the fourth port according to the stored information and the information sent by the second network device; determine whether at least one BFD session in the established BFD sessions is up; and if at least one BFD session in the established BFD sessions is up, determine that the aggregated link is available.

According to the second aspect, a first implementation manner is provided. The information about the first aggregated port includes a source port number, a destination port number, a protocol number, and an IP address of the first aggregated port. The information about the second aggregated port includes an IP address of the second aggregated port.

According to the second aspect, a second implementation manner is provided. The information about the first aggregated port includes a source port number, a destination port number, a protocol number, and an IP address of the first aggregated port. The information about the second aggregated port includes a source port number, a destination port number, a protocol number, and an IP address of the second aggregated port.

According to the second aspect, a third implementation manner is provided. The information about the first aggregated port includes a loopback address of the second network device, a unidirectional label switched path identifier of a unidirectional label switched path from the first aggregated port to the second aggregated port, a unidirectional tunnel identifier of a unidirectional tunnel from the first aggregated port to the second aggregated port, and a loopback address of the first network device. The information about the second aggregated port includes the loopback address of the first network device, a unidirectional label switched path identifier of a unidirectional label switched path from the second aggregated port to the first aggregated port, a unidirectional tunnel identifier of a unidirectional tunnel from the second aggregated port to the first aggregated port, and the loopback address of the second network device.

According to the second aspect, a fourth implementation manner is provided. The information about the first aggregated port includes an IPv4 address of the first network device and an identifier and a type of a pseudo wire between the first aggregated port and the second aggregated port. The information about the second aggregated port includes an IPv4 address of the second network device and an identifier and a type of a pseudo wire between the second aggregated port and the first aggregated port.

According to a third aspect, a system for performing detection on an aggregated link between a first network device and a second network device is provided, including the first network device and the second network device according to the second aspect or any implementation manner of the second aspect.

Optionally, the first network device includes a first component and a second component that are replaceable. A first port is on the first component, and a second port is on the second component.

The second network device includes a third component and a fourth component that are replaceable. A third port is on the third component, and a fourth port is on the fourth component.

It can be learned from the foregoing technical solutions that, according to the method, the device, and the system in the embodiments of the present disclosure, more than one BFD session can be established between a pair of aggregated ports to detect whether an aggregated link is faulty. Therefore, compared with the prior art in which one BFD session is used to detect whether an aggregated link is faulty, the technical solutions help resolve a problem of misjudgment that the aggregated link is faulty.

BRIEF DESCRIPTION OF THE DRAWINGS

To describe technical solutions in the present disclosure more clearly, the following briefly describes accompanying drawings used in embodiments. The accompanying drawings in the following are merely accompanying drawings of some embodiments of the present disclosure, and persons of ordinary skill in the art may derive other technical solutions and accompanying drawings from these accompanying drawings of the present disclosure without creative efforts. These technical solutions and accompanying drawings should also be considered as falling within the scope of the present disclosure.

FIG. 3C and FIG. 3F to FIG. 3P are example diagrams of a sub-type-length-value (sub-TLV) of a BFD control packet according to an embodiment of the present disclosure;

FIG. 3D and FIG. 3E are schematic diagrams of composition of a BFD control packet according to an embodiment of the present disclosure;

DETAILED DESCRIPTION

To make the objectives, technical solutions, and advantages of the present disclosure clearer, the following clearly describes the technical solutions of the present disclosure with reference to the accompanying drawings and the embodiments. The following described embodiments are merely some embodiments of the present disclosure. Specific embodiments illustrated in the accompanying drawings are described in detail herein, and examples of the embodiments described herein may be modified and replaced in various forms.

Figure 1:
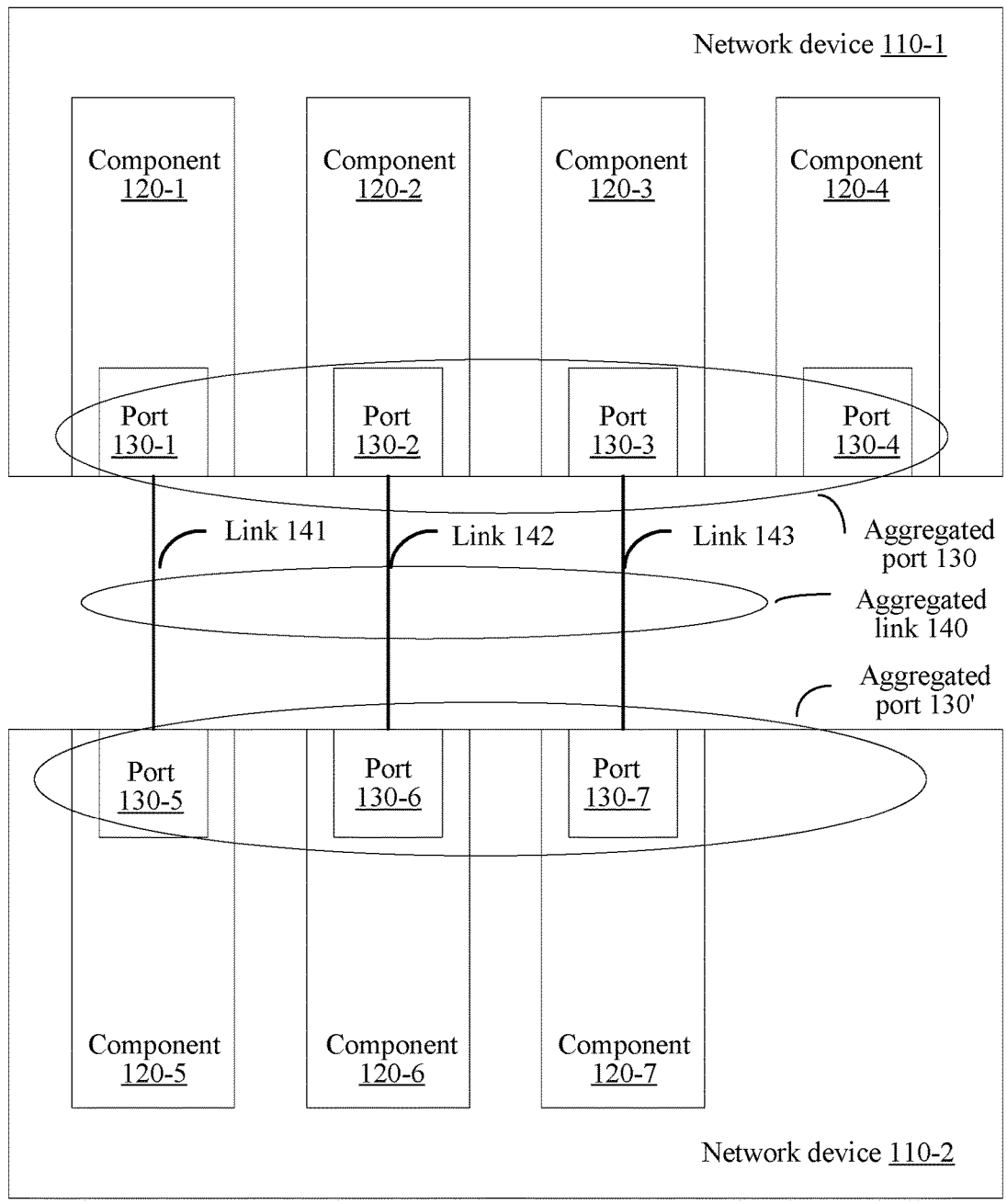
FIG. 1 is a schematic diagram of a network system for implementing the embodiments of the present disclosure.

FIG. 1 shows a network system. For example, the network system includes two network devices 110-1 and 110-2. The network device 110-1 and the network device 110-2 are coupled using an aggregated link 140. The network device 110-1 and the network device 110-2 each may be one of the following types of network devices: a router, a switch, a stackable switch, a bridge, a gateway, a virtual network device, and the like. The network device 110-1 and the network device 110-2 may be network devices of a same type, or may be network devices of different types.

In an example shown in FIG. 1, the network device 110-1 includes four components 120-1 to 120-4, and the network device 110-2 includes three components 120-5 to 120-7. Each component or at least some components can be removed, or can be replaced without depending on another component. For example, the component may be a line card or a virtual network device subunit. For example, if the component 120-1 is faulty, the component 120-1 may be removed from the network device 110-1. Removal of the component 120-1 does not cause necessary removal of the components 120-2 to 120-4. It should be noted that, FIG. 1 is merely an example. In another example, each of the network devices coupled using the aggregated link may include fewer or more components. Quantities of components in all of the network devices may be the same, or may be different.

Each component includes one or more ports. For example, the component 120-1 includes a port 130-1. The component 120-2 includes a port 130-2. The component 120-3 includes a port 130-3. The component 120-4 includes a port 130-4. All the ports 130-1 to 130-4 are ports of the network device 110-1. The component 120-5 includes a port 130-5. The component 120-6 includes a port 130-6. The component 120-7 includes a port 130-7. All the ports 130-5 to 130-7 are ports of the network device 110-2. Each of the ports 130-1 to 130-7 may be a physical port or a logical port. The aggregated link 140 includes three links: links 141, 142, and 143. The three links may be physical or logical. The port 130-1 is coupled to the port 130-5 using the link 141. The port 130-2 is coupled to the port 130-6 using the link 142. The port 130-3 is coupled to the port 130-7 using the link 143. Ports that are in a same network device and coupled to links in a same aggregated link are considered as parts of an aggregated port. The ports 130-1 to 130-3 are in the network device 110-1, and each of the ports is coupled to a link in the aggregated link 140. Therefore, the ports 130-1 to 130-3 constitute an aggregated port 130. The network device 110-1 may use the aggregated port like using a common non-aggregated port. Likewise, the network device 110-2 may use the ports 130-5 to 130-7 as an aggregated port 130'. FIG. 1 is merely an example. In another example, at least two ports that constitute an aggregated port may be on a same component.

An embodiment of the present disclosure provides a network fault detection method. Compared with a detection method in the prior art, the method provided in this embodiment of the present disclosure can resolve a problem that a misjudgment occurs when an aggregated link is detected using BFD.

Figure 2:
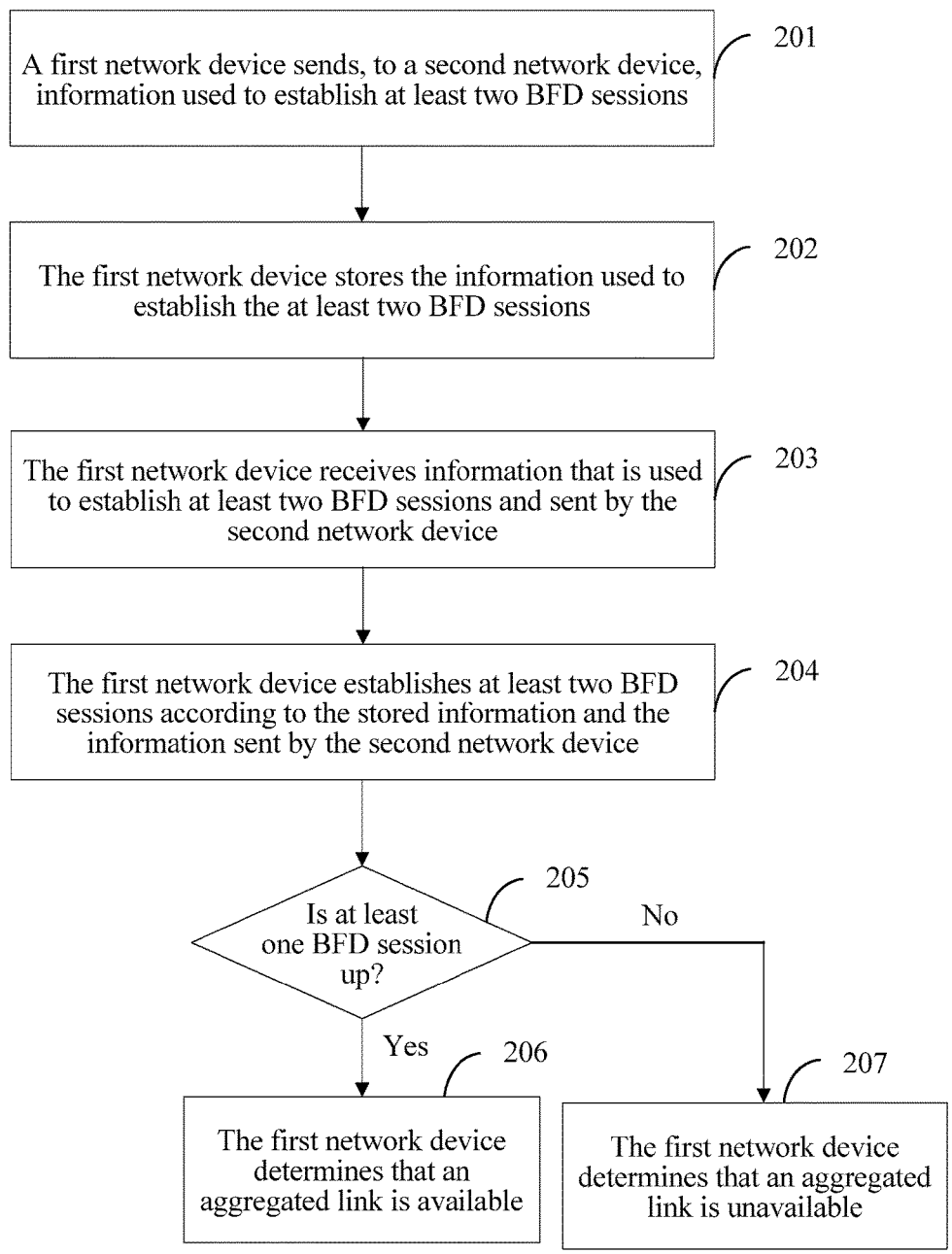
FIG. 2 is a simplified flowchart of a method according to an embodiment of the present disclosure.

FIG. 2 is a simplified flowchart of a fault detection method according to an embodiment of the present disclosure. The method is, for example, applied to a network structure similar to the network structure shown in FIG. 1, and includes operations described below. It should be noted that, the method shown in FIG. 2 may not only be applied to the network structure shown in FIG. 1, but also may be applied to another type of network system, such as a network system including a network device that does not include a replaceable component.

201. A first network device sends, to a second network device, information used to establish at least two BFD sessions, where the information includes information about a first aggregated port, information about a second aggregated port, an identifier of a first port, a session identifier associated with the identifier of the first port, an identifier of a second port, and a session identifier associated with the identifier of the second port. The first port and the second port are ports in the first aggregated port. An aggregated link exists between the first aggregated port of the first network device and the second aggregated port of the second network device. The information sent by the first network device to the second network device may be generated by the first network device, or may be manually preconfigured.

With reference to the example in FIG. 1, the network device 110-1 sends, to the network device 110-2, information used to establish two BFD sessions. The information includes information about the aggregated port 130, information about the aggregated port 130', an identifier (for example, 10) of the port 130-1, a session identifier (for example, 1) associated with the identifier of the port 130-1, an identifier (for example, 20) of the port 130-2, and a session identifier (for example, 2) associated with the identifier of the port 130-2.

202. The first network device stores the information used to establish the at least two BFD sessions.

203. The first network device receives information that is used to establish at least two BFD sessions and sent by the second network device. The information sent by the second network device includes the information about the second aggregated port, the information about the first aggregated port, an identifier of a third port, a session identifier associated with the identifier of the third port, an identifier of a fourth port, and a session identifier associated with the identifier of the fourth port. The session identifier associated with the identifier of the third port is the same as the session identifier associated with the identifier of the first port. The session identifier associated with the identifier of the fourth port is the same as the session identifier associated with the identifier of the second port. The third port and the fourth port are ports in the second aggregated port. Operation 203 may be performed after or before operation 201, or the two may be concurrently performed.

FIG. 1 is used as an example. The network device 110-1 receives information that is used to establish two BFD sessions and sent by the network device 110-2. The information sent by the network device 110-2 includes the information about the aggregated port 130', the information about the aggregated port 130, an identifier (for example, 50) of the port 130-5, a session identifier (for example, 1) associated with the identifier of the port 130-5, an identifier (for example, 60) of the port 130-6, and a session identifier (for example, 2) associated with the identifier of the port 130-6.

204. The first network device establishes a BFD session between the first port and the third port and a BFD session between the second port and the fourth port according to the stored information and the information sent by the second network device.

FIG. 1 is used as an example. The network device 110-1 establishes a BFD session between the port 130-1 and the port 130-5 and a BFD session between the port 130-2 and the port 130-6 according to the stored information used to establish the two BFD sessions and the received information that is used to establish the two BFD sessions and sent by the network device 110-2. Multiple solutions may be used for specific implementation. For example, the network device 110-1 searches, according to the information about the aggregated port 130', the information about the aggregated port 130, and the session identifier (for example, 1) associated with the identifier of the port 130-5 that are sent by the network device 110-2, the information stored on the network device 110-1, to determine whether there is a match. A match is found. The match includes the information about the aggregated port 130', the information about the aggregated port 130, the identifier of the port 130-1, and the session identifier 1. The network device 110-1 determines that the port 130-1 and the port 130-5 are a pair of ports between which a BFD session can be established, and establishes the BFD session between the port 130-1 and the port 130-5. Similarly, the network device 110-1 determines that the port 130-2 and the port 130-6 are a pair of ports between which a BFD session can be established, and establishes the BFD session between the port 130-2 and the port 130-6. In addition to the foregoing manner, other manners may be used. For example, the network device 110-1 searches, according to the information about the aggregated port 130, the information about the aggregated port 130', and the session identifier (for example, 1) associated with the identifier of the port 130-1 that are stored on the network device 110-1, the information sent by the network device 110-2, to determine whether there is a match. If a match is found, the foregoing operation is performed.

205. The first network device determines whether at least one BFD session in the established BFD sessions is up. There may be multiple implementation solutions to determining whether the BFD session is up. For details, refer to a description in Requirement For Comments (RFC) 5880 of the Internet Engineering Task Force (IETF), and details are not described herein.

If at least one BFD session in the established BFD sessions is up, 206 is performed. Optionally, if it is determined that no BFD session in the established BFD sessions is up, 207 is performed. Up indicates that the BFD session is successfully established, and means that a connection between systems is working.

206. The first network device determines that the aggregated link is available.

207. The first network device determines that the aggregated link is unavailable.

With reference to the example in FIG. 1, if the network device 110-1 determines that the BFD session between the port 130-1 and the port 130-5 is up and that the BFD session between the port 130-2 and the port 130-6 is up, the network device 110-1 determines that the aggregated link 140 is available. If the network device 110-1 determines that the BFD session between the port 130-1 and the port 130-5 is down and that the BFD session between the port 130-2 and the port 130-6 is up, the network device 110-1 determines that the aggregated link 140 is available. If the network device 110-1 determines that the BFD session between the port 130-1 and the port 130-5 is up and that the BFD session between the port 130-2 and the port 130-6 is down, the network device 110-1 determines that the aggregated link 140 is available. If the network device 110-1 determines that the BFD session between the port 130-1 and the port 130-5 is down and that the BFD session between the port 130-2 and the port 130-6 is down, the network device 110-1 determines that the aggregated link 140 is unavailable. Herein, that the BFD sessions are respectively established between the two pairs of ports is described as an example. In another example, more than two BFD sessions may be established. With reference to FIG. 1, BFD sessions may be respectively established between three pairs of ports. In other words, three BFD sessions are established. When at least one BFD session is not down, it is determined that the aggregated link 140 is available. When all the three BFD sessions are down, it is determined that the aggregated link 140 is unavailable.

The following provides a detailed description using an example in which the network device 110-1 sends, to the network device 110-2, information used to establish two BFD sessions. The information used to establish the two BFD sessions may be carried in one BFD control packet, or may be separately carried in two BFD control packets. The BFD control packet may be in multiple formats. The following is a specific format example. However, an application described herein is not intended for being limited to disclose specific forms. On the contrary, the disclosure encompasses all modifications, equivalences, and replacements that fall within the scope of the appended claims.

Figures 3A, 3B:
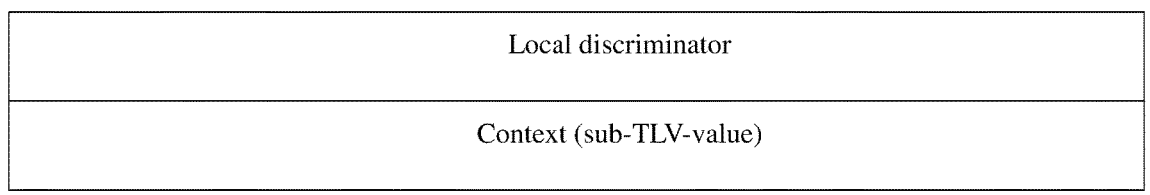
FIG. 3A is a schematic diagram of a format of a BFD control packet according to an embodiment of the present disclosure.
FIG. 3B is an implementation example of a context shown in FIG. 3A according to an embodiment of the present disclosure.

FIG. 3A shows a format of the BFD control packet. A version (Vers) filed is a version number of a protocol. A version number defined in RFC 5880 is 1. A version number other than 1, for example, 2, 3, or another value that is not 1, may be used in this embodiment of the present disclosure. When an authentication present (A) field is set, there is an authentication stage, and a session is to be authenticated. A single hop/multi-hop (S/M) field is used to identify a single hop BFD or a multi-hop BFD. For example, the field is set to 0 to identify the single hop, and set to 1 to identify the multi-hop. For a poll (P) field and a final (F) field, refer to the description in RFC 5880. A return code field may be used to query a remote-end supported mode. A transaction number (Trans Num) field and a sequence number (Seq Num) field are used together to ensure a time sequence of message exchange. A protocol data unit type (PDU type) field is used to identify a sub session map. A PDU length field carries a PDU length. A context field carries a sub-type-value.

FIG. 3B shows an implementation solution of the context field in FIG. 3A. As shown in FIG. 3B, the context field in FIG. 3A carries the identifier of the first port and another context. With reference to the example in FIG. 1, a local discriminator field may carry a discriminator of the port 130-1. A discriminator of a port is used by a network device to uniquely identify a local port, and may be allocated by the network device, or may be obtained in another manner, for example, specified by a user. The context field shown in FIG. 3B uses a sub type-length-value-value (sub-TLV-value), to carry the information about the first aggregated port (for example, the information about the aggregated port 130), the information about the second aggregated port (for example, the information about the aggregated port 130'), and the session identifier associated with the identifier of the first port (for example, the port 130-1). The session identifier associated with the identifier of the port 130-1 is used to identify the BFD session that is to be established on the port 130-1.

The information about the first aggregated port and the information about the second aggregated port that are described in the method embodiment shown in FIG. 2 may be implemented in multiple cases.

Case 1: The information about the aggregated port 130 includes a source port number, a destination port number, a protocol number, and an IPv4 address of the aggregated port 130, and may be carried using a sub-TLV that is shown in FIG. 3C and whose type is local application information for IPv4 (local App Info for IPv4). In the sub-TLV, a sub-TLV-type field is used to identify local application information for IPv4 that is carried in a value in the sub-TLV. A length field carries a length of the sub-TLV. A local address field carries the IPv4 address of the aggregated port 130. The sub-TLV further includes three fields: a source port number field, a destination port (Dest port) number field, and a local protocol number (local protocol Num) field that are respectively used to carry the source port number, the destination port number, and the protocol number.

The information about the aggregated port 130' includes a source port number, a destination port number, a protocol number, and an IPv4 address of the aggregated port 130', and may be carried using a sub-TLV that is shown in FIG. 3C and whose type is remote application information for IPv4 (remote App Info for IPv4). The sub-TLV further includes three fields: a source port number field, a destination port number field, and a remote protocol number field that are respectively used to carry the source port number, the destination port number, and the protocol number.

The foregoing information is used together to identify an application that is on the aggregated link 140 and that is to be detected using the to-be-established BFD sessions. For example, if all the source port number, the destination port number, and a local protocol number in the local App Info for IPv4 sub-TLV are 0, and all the source port number, the destination port number, and a remote protocol number in the remote App Info for IPv4 sub-TLV are 0, it indicates that the to-be-established BFD sessions are used to detect all IPv4-based applications on the aggregated link 140. For another example, if in the local App Info for IPv4 sub-TLV, both the source port number and the destination port number are 0, and a local protocol number is 89, and in the remote App Info for IPv4 sub-TLV, both the source port number and the destination port number are 0, and a remote protocol number is 89, it indicates that the to-be-established BFD sessions are used to detect an application that uses OSPF and that is on the aggregated link 140. For another example, if in the local App Info for IPv4 sub-TLV, the source port number is 0, the destination port number is 520, and a local protocol number is 17, and in the remote App Info for IPv4 sub-TLV, the source port number is 0, the destination port number is 520, and a remote protocol number is 17, it indicates that the to-be-established BFD sessions are used to detect an application that uses the RIP and that is on the aggregated link 140.

For example, FIG. 3D overall shows the format of the BFD control packet sent by the network device 110-1 to the network device 110-2 in case 1. A local session identifier (local session ID) field is included in the BFD control packet and used to carry a local session identifier associated with a local discriminator, for example, a session identifier associated with the discriminator of the port 130-1.

It is mentioned above that the information that is used to establish the two BFD sessions and sent by the network device 110-1 to the network device 110-2 further includes a discriminator of the port 130-2 and a session identifier associated with the discriminator of the port 130-2. The information that is used to establish the two BFD sessions and sent by the network device 110-1 to the network device 110-2 may be implemented in multiple manners. For example, the information may be implemented using two BFD control packets shown in FIG. 3D. One BFD control packet carries the discriminator of the port 130-1 and the session identifier associated with the discriminator of the port 130-1. The other BFD control packet carries the discriminator of the port 130-2 and the session identifier associated with the discriminator of the port 130-2. For another example, the information that is used to establish the two BFD sessions and sent by the network device 110-1 to the network device 110-2 may be implemented using one BFD control packet shown in FIG. 3E. The BFD control packet carries the discriminator of the port 130-1, the session identifier associated with the discriminator of the port 130-1, the discriminator of the port 130-2, and the session identifier associated with the discriminator of the port 130-2.

In both of examples in FIG. 3D and FIG. 3E, the application that is to be detected using the to-be-established BFD sessions are based on the IPv4 protocol. If an application that is to be detected using the to-be-established BFD sessions are based on the IPv6 protocol, a sub-TLV that is shown in FIG. 3F and whose type is local App Info for IPv6 may be used to replace the local App Info for IPv4 sub-TLV in FIG. 3D/3E, and a remote App Info for IPv6 sub-TLV may be used to replace the remote App Info for IPv4 sub-TLV in FIG. 3D/3E. Details are not described herein.

Case 2: The information about the aggregated port 130 includes a source port number, a destination port number, a protocol number, and an IPv4 address of the aggregated port 130. The information about the aggregated port 130' includes an IPv4 address of the aggregated port 130'. The information indicates that the to-be-established BFD sessions are used to detect an IPv4-based application on the aggregated link 140 in a direction from the aggregated port 130 to the aggregated port 130', and to detect a LDP LSP on the aggregated link 140 in a direction from the aggregated port 130' to the aggregated port 130. The information about the aggregated port 130 and the information about the aggregated port 130' may be respectively carried using two sub-TLVs shown in FIG. 3G. The local App Info for IPv4 sub-TLV and the remote App Info for IPv4 sub-TLV in FIG. 3D/3E are respectively replaced with the two sub-TLVs shown in FIG. 3G. Details are not described herein. Similar to that mentioned above, if all the source port number, the destination port number, and the protocol number are 0, it indicates that the to-be-established BFD sessions are used to detect all IPv4-based applications on the aggregated link 140 in a direction from the aggregated port 130 to the aggregated port 130'. If both the source port number and the destination port number are 0, and the protocol number is 89, it indicates that the to-be-established BFD sessions are used to detect an application that uses OSPF and that is on the aggregated link 140 in a direction from the aggregated port 130 to the aggregated port 130'. For another example, if the source port number is 0, the destination port number is 520, and the protocol number is 17, it indicates that the to-be-established BFD sessions are used to detect an application that uses the RIP and that is on the aggregated link 140 in a direction from the aggregated port 130 to the aggregated port 130'.

Case 3: The information about the aggregated port 130 includes a source port number, a destination port number, a protocol number, and an IPv6 address of the aggregated port 130. The information about the aggregated port 130' includes an IPv4 address of the aggregated port 130'. The information indicates that the to-be-established BFD sessions are used to detect an IPv6-based application on the aggregated link 140 in a direction from the aggregated port 130 to the aggregated port 130', and to detect an LDP LSP on the aggregated link 140 in a direction from the aggregated port 130' to the aggregated port 130. The information about the aggregated port 130 and the information about the aggregated port 130' may be respectively carried using two sub-TLVs shown in FIG. 3H. The local App Info for IPv4 sub-TLV and the remote App Info for IPv4 sub-TLV in FIG. 3D/3E are respectively replaced with the two sub-TLVs shown in FIG. 3H. Details are not described herein.

Case 4: The information about the aggregated port 130 includes a source port number, a destination port number, a protocol number, and an IPv4 address of the aggregated port 130. The information about the aggregated port 130' includes an IPv6 address of the aggregated port 130'. The information indicates that the to-be-established BFD sessions are used to detect an IPv4-based application on the aggregated link 140 in a direction from the aggregated port 130 to the aggregated port 130', and to detect an LDPv6 LSP on the aggregated link 140 in a direction from the aggregated port 130' to the aggregated port 130. The information about the aggregated port 130 and the information about the aggregated port 130' may be respectively carried using two sub-TLVs shown in FIG. 3I. The local App Info for IPv4 sub-TLV and the remote App Info for IPv4 sub-TLV in FIG. 3D/3E are respectively replaced with the two sub-TLVs shown in FIG. 3I. Details are not described herein.

Case 5: The information about the aggregated port 130 includes a source port number, a destination port number, a protocol number, and an IPv6 address of the aggregated port 130. The information about the aggregated port 130' includes an IPv6 address of the aggregated port 130'. The information indicates that the to-be-established BFD sessions are used to detect an IPv6-based application on the aggregated link 140 in a direction from the aggregated port 130 to the aggregated port 130', and to detect an LDPv6 LSP on the aggregated link 140 in a direction from the aggregated port 130' to the aggregated port 130. The information about the aggregated port 130 and the information about the aggregated port 130' may be respectively carried using two sub-TLVs shown in FIG. 3J. The local App Info for IPv4 sub-TLV and the remote App Info for IPv4 sub-TLV in FIG. 3D/3E are respectively replaced with the two sub-TLVs shown in FIG. 3J. Details are not described herein.

Case 6: The information about the aggregated port 130 includes a loopback (loopback) address of the network device 110-2, a unidirectional LSP ID of a unidirectional LSP from the aggregated port 130 to the aggregated port 130', a unidirectional tunnel ID of a unidirectional tunnel from the aggregated port 130 to the aggregated port 130', and a loopback address of the network device 110-1. Herein, the loopback address is an IPv4 address. The information about the aggregated port 130' includes the loopback address of the network device 110-1, a unidirectional LSP ID of a unidirectional LSP from the aggregated port 130' to the aggregated port 130, a unidirectional tunnel ID of a unidirectional tunnel from the aggregated port 130' to the aggregated port 130, and the loopback address of the network device 110-2. The information indicates that the to-be-established BFD sessions are used to detect an RSVP-based application on the aggregated link 140 in a direction from the aggregated port 130 to the aggregated port 130', and to detect an RSVP-based application on the aggregated link 140 in a direction from the aggregated port 130' to the aggregated port 130.

The information about the aggregated port 130 may be carried using a sub-TLV that is shown in FIG. 3K and whose type is local application information for Resource Reservation Protocol (local App Info for RSVP). As shown in FIG. 3K, an end point address (end point address) field is used to carry the loopback address of the network device 110-2. An LSP ID field is used to carry the unidirectional LSP ID of the unidirectional LSP from the aggregated port 130 to the aggregated port 130'. A tunnel ID field is used to carry the unidirectional tunnel ID of the unidirectional tunnel from the aggregated port 130 to the aggregated port 130'. A sender address field is used to carry the loopback address of the network device 110-1. The sub-TLV may further include a mode used to indicate that a type of a remote sub-TLV is an LSP. The sub-TLV may further include an extended tunnel ID. For details, refer to RFC 3209.

The information about the aggregated port 130' may be carried using a sub-TLV that is shown in FIG. 3K and whose type is remote App Info for RSVP. Fields included in the sub-TLV are similar to the fields included in the first sub-TLV shown in FIG. 3K. Details are not described herein. The local App Info for IPv4 sub-TLV and the remote App Info for IPv4 sub-TLV in FIG. 3D/3E are respectively replaced with the two sub-TLVs shown in FIG. 3K. Details are not described herein.

Case 7: The information about the aggregated port 130 includes a source port number, a destination port number, a protocol number, and an IPv4 address of the aggregated port 130. The information about the aggregated port 130' includes a loopback address of the network device 110-1, a unidirectional LSP ID of a unidirectional LSP from the aggregated port 130' to the aggregated port 130, a unidirectional tunnel ID of a unidirectional tunnel from the aggregated port 130' to the aggregated port 130, and a loopback address of the network device 110-2. The information indicates that the to-be-established BFD sessions are used to detect an IPv4-based application on the aggregated link 140 in a direction from the aggregated port 130 to the aggregated port 130', and to detect an RSVP-based application on the aggregated link 140 in a direction from the aggregated port 130' to the aggregated port 130.

The information about the aggregated port 130 may be carried using the first sub-TLV shown in FIG. 3L. Details are described in FIG. 3C and not described herein again. The information about the aggregated port 130' may be carried using the second sub-TLV shown in FIG. 3L. Fields in the sub-TLV are described above, and details are not described herein again.

The local App Info for IPv4 sub-TLV and the remote App Info for IPv4 sub-TLV in FIG. 3D/3E are respectively replaced with the two sub-TLVs shown in FIG. 3L. Details are not described herein.

Case 8: This case is similar to case 6; however, a loopback address herein is an IPv6 address. It indicates that the to-be-established BFD sessions are used to detect an RSVPv6-based application on the aggregated link 140 in a direction from the aggregated port 130 to the aggregated port 130', and to detect an RSVPv6-based application on the aggregated link 140 in a direction from the aggregated port 130' to the aggregated port 130. The information about the aggregated port 130 and the information about the aggregated port 130' in this case may be respectively carried using two sub-TLVs shown in FIG. 3M. The local App Info for IPv4 sub-TLV and the remote App Info for IPv4 sub-TLV in FIG. 3D/3E are respectively replaced with the two sub-TLVs shown in FIG. 3M. Details are not described herein.

Case 9: This case is similar to case 7; however, an IPv6 address is used. The information indicates that the to-be-established BFD sessions are used to detect an IPv6-based application on the aggregated link 140 in a direction from the aggregated port 130 to the aggregated port 130', and to detect an RSVPv6-based application on the aggregated link 140 in a direction from the aggregated port 130' to the aggregated port 130. The information about the aggregated port 130 and the information about the aggregated port 130' may be respectively carried using two sub-TLVs shown in FIG. 3N. The local App Info for IPv4 sub-TLV and the remote App Info for IPv4 sub-TLV in FIG. 3D/3E are respectively replaced with the two sub-TLVs shown in FIG. 3N. Details are not described herein.

Case 10: The information about the aggregated port 130 includes an IPv4 address of the network device 110-1 and an identifier and a type of a pseudo wire (PW) between the aggregated port 130 and the aggregated port 130'. The information about the aggregated port 130' includes an IPv4 address of the network device 110-2 and the identifier and a type of a PW between the aggregated port 130' and the aggregated port 130. The information indicates that the to-be-established BFD sessions are used to detect an application that is based on forwarding equivalence class (FEC) 128 and that is on the aggregated link 140 in a direction from the aggregated port 130 to the aggregated port 130', and to detect an FEC 128-based application on the aggregated link 140 in a direction from the aggregated port 130' to the aggregated port 130.

The information about the aggregated port 130 may be carried using the first sub-TLV shown in FIG. 3O. A local LSR ID field carries the IPv4 address of the network device 110-1. A local PW ID field and a local PW type field respectively carry the identifier and the type of the PW between the aggregated port 130 and the aggregated port 130'. The information about the aggregated port 130' may be carried using the second sub-TLV shown in FIG. 3O. A local LSR ID field carries the IPv4 address of the network device 110-2. A local PW ID field and a local PW type field respectively carry the identifiers and the types of the PWs between the aggregated port 130' and the aggregated port 130. The local App Info for IPv4 sub-TLV and the remote App Info for IPv4 sub-TLV in FIG. 3D/3E are respectively replaced with the two sub-TLVs shown in FIG. 3O. Details are not described herein.

Case 11: The information about the aggregated port 130 includes an IPv4 address of the network device 110-1, a type of a PW between the aggregated port 130 and the aggregated port 130', and an attachment group identifier type (AGI type), an AGI length, and an AGI value of the PW to which the aggregated port 130 belongs; and may be carried using the first sub-TLV shown in FIG. 3O. The sub-TLV may further include an AII type field, an AII length field, and an AII value field. For details, refer to a description in RFC 4446. Similarly, the information about the aggregated port 130' may be carried using the second sub-TLV shown in FIG. 3P. The information indicates that the to-be-established BFD sessions are used to detect an FEC 129-based application on the aggregated link 140 in a direction from the aggregated port 130 to the aggregated port 130', and to detect an FEC 129-based application on the aggregated link 140 in a direction from the aggregated port 130' to the aggregated port 130. The local App Info for IPv4 sub-TLV and the remote App Info for IPv4 sub-TLV in FIG. 3D/3E are respectively replaced with the two sub-TLVs shown in FIG. 3P. Details are not described herein.

It can be learned from the foregoing embodiment that, in the solutions in this embodiment, more than one BFD session is established between a pair of aggregated ports to detect whether an aggregated link is faulty. Therefore, compared with the prior art in which one BFD session is used to detect whether an aggregated link is faulty, the solutions help resolve a problem of misjudgment that the aggregated link is faulty.

Figure 4:
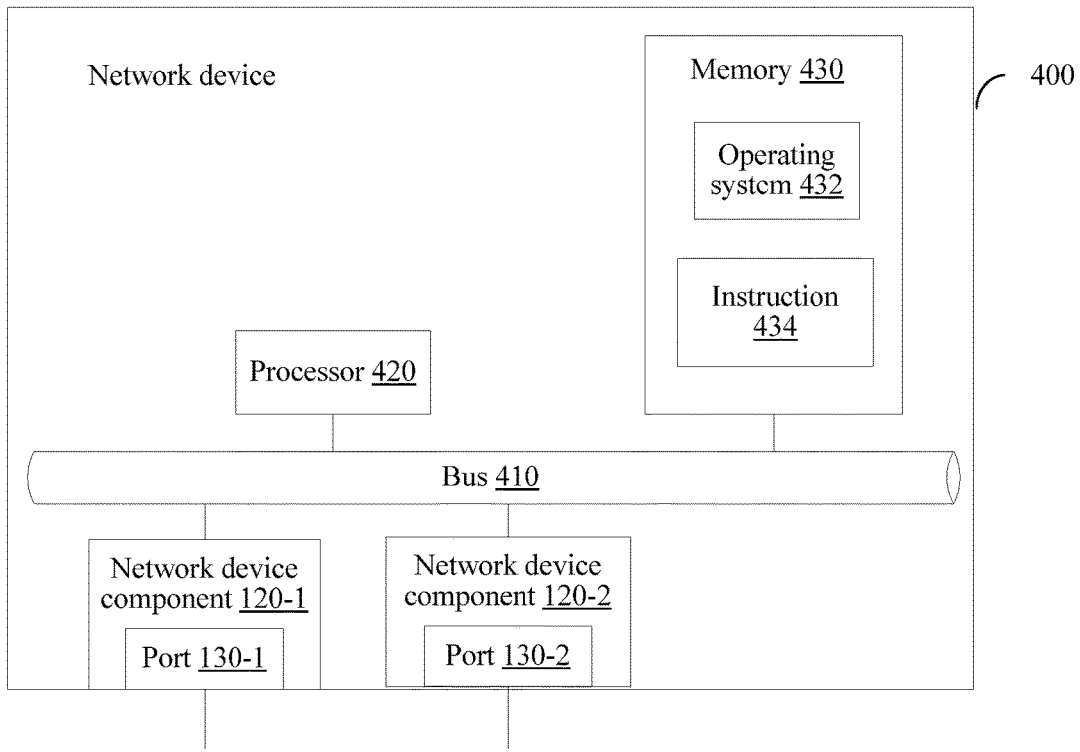
FIG. 4 is a simplified structural block diagram of a network device according to an embodiment of the present disclosure.

FIG. 4 is a simplified structural block diagram of an example of a network device. As shown in FIG. 4, the network device 400 may be the network device 110-1 shown in FIG. 1. The network device 400 includes at least two components such as components 120-1 and 120-2, one or more processors 420, and one or more memories 430 that are interconnected using a system bus 410. The component includes one or more of a mechanical port, an electronic port, or a port supported by a required signal circuit. FIG. 4 shows an example in which the component 120-1 includes a port 130-1 and the component 120-2 includes a port 130-2. The memory 430 is configured to store an instruction 434. The processor 420 is configured to read the instruction 434 in the memory 430 to perform the method shown in FIG. 2.

For example, the memory 430 may be one or more of various media that can store program code, such as a read-only memory (ROM), a random access memory (RAM), a magnetic disk, or an optical disc. For example, the program code may be installed in the network device 400, or may be downloaded according to a requirement in a running process. For another example, the memory 430 may store a part of an operating system 432. The part of the operating system 432 may be executed by the processor 420 to systematize the network device 400 with respect to functions.

Figure 5:
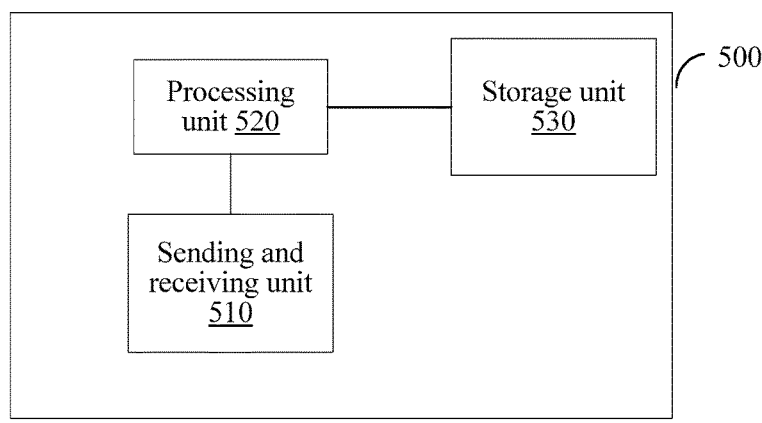
FIG. 5 is another simplified structural block diagram of a network device according to an embodiment of the present disclosure.

FIG. 5 is another simplified structural block diagram of an example of a first network device. As shown in FIG. 5, the first network device 500 may be the network device 110-1 shown in FIG. 1. The first network device 500 includes a sending and receiving unit 510, a processing unit 520, and a storage unit 530.

The sending and receiving unit 510 is configured to send, to a second network device, information used to establish at least two BFD sessions. The information includes information about a first aggregated port, information about a second aggregated port, an identifier of a first port, a session identifier associated with the identifier of the first port, an identifier of a second port, and a session identifier associated with the identifier of the second port. The first port and the second port are ports in the first aggregated port. An aggregated link exists between the first aggregated port of the first network device and the second aggregated port of the second network device. The session identifier associated with the identifier of the first port is used to identify a BFD session that is to be established on the first port. The session identifier associated with the identifier of the second port is used to identify a BFD session that is to be established on the second port.

The storage unit 530 is configured to store the information that is used to establish the at least two BFD sessions and sent to the second network device.

The sending and receiving unit 510 is further configured to receive information that is used to establish at least two BFD sessions and sent by the second network device. The information sent by the second network device includes the information about the second aggregated port, the information about the first aggregated port, and an identifier of a third port, a session identifier associated with the identifier of the third port, an identifier of a fourth port, and a session identifier associated with the identifier of the fourth port. The session identifier associated with the identifier of the third port is the same as the session identifier associated with the identifier of the first port. The session identifier associated with the identifier of the fourth port is the same as the session identifier associated with the identifier of the second port. The third port and the fourth port are ports in the second aggregated port. The session identifier associated with the identifier of the third port is used to identify a BFD session that is to be established on the third port. The session identifier associated with the identifier of the fourth port is used to identify a BFD session that is to be established on the fourth port.

The processing unit 520 is configured to establish a BFD session between the first port and the third port and a BFD session between the second port and the fourth port according to the stored information and the information sent by the second network device; determine whether at least one BFD session in the established BFD sessions is up; and if at least one BFD session in the established BFD sessions is up, determine that the aggregated link is available.

In practical application, the corresponding unit in the embodiment shown in FIG. 5 may be implemented by corresponding hardware, or may be implemented by corresponding hardware by executing corresponding software. For example, the sending and receiving unit 510 may be hardware that performs functions of the sending and receiving unit, such as a port of a component, or may be a sending and receiving circuit or another hardware device that can execute a corresponding computer program to complete the foregoing operations. For another example, the processing unit 510 may be hardware that performs functions of the processing unit, such as a processor. The described principle is applicable to each embodiment provided in this specification.

Finally, it should be noted that, the foregoing embodiments are merely used as examples for describing the technical solutions of the present disclosure, rather than limiting the present disclosure. Features disclosed in this specification and in claims and accompanying drawings in proper cases may be provided independently or in any proper combination. A feature implemented by hardware in the description may also be implemented by software, and vice versa. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for performing bidirectional forwarding detection (BFD) on an aggregated link between a first network device and a second network device, wherein the aggregated link exists between a first aggregated port of the first network device and a second aggregated port of the second network device, wherein the first aggregated port comprises a first port and a second port, wherein the second aggregated port comprises a third port and a fourth port, and wherein the method comprises:

sending, by the first network device to the second network device, information used to establish at least two BFD sessions, wherein the information comprises information about the first aggregated port, information about the second aggregated port, an identifier of the first port, a session identifier associated with the identifier of the first port, an identifier of the second port, and a session identifier associated with the identifier of the second port, wherein the session identifier associated with the identifier of the first port is used to identify a BFD session that is to be established on the first port, and wherein the session identifier associated with the identifier of the second port is used to identify a BFD session that is to be established on the second port;

storing, by the first network device, the information that is used to establish the at least two BFD sessions and that is sent to the second network device;

receiving, by the first network device, information that is used to establish at least two BFD sessions and sent by the second network device, wherein the information sent by the second network device comprises the information about the second aggregated port, the information about the first aggregated port, an identifier of the third port, a session identifier associated with the identifier of the third port, an identifier of the fourth port, and a session identifier associated with the identifier of the fourth port, wherein the session identifier associated with the identifier of the third port is the same as the session identifier associated with the identifier of the first port, wherein the session identifier associated with the identifier of the fourth port is the same as the session identifier associated with the identifier of the second port, wherein the session identifier associated with the identifier of the third port is used to identify a BFD session that is to be established on the third port, and wherein the session identifier associated with the identifier of the fourth port is used to identify a BFD session that is to be established on the fourth port;

establishing, by the first network device, a BFD session between the first port and the third port and a BFD session between the second port and the fourth port according to the stored information and the information sent by the second network device; and determining, by the first network device, that the aggregated link is available when at least one BFD session in the established BFD sessions is up.

2. The method according to claim 1, wherein the first network device comprises a first component and a second component that are replaceable, wherein the first port is on the first component, and wherein the second port is on the second component.

3. The method according to claim 1, wherein the second network device comprises a third component and a fourth component that are replaceable, wherein the third port is on the third component, and wherein the fourth port is on the fourth component.

4. The method according to claim 1, wherein the information about the first aggregated port comprises a source port number, a destination port number, a protocol number, and an Internet Protocol (IP) address of the first aggregated port, and wherein the information about the second aggregated port comprises an IP address of the second aggregated port.

5. The method according to claim 1, wherein the information about the first aggregated port comprises a source port number, a destination port number, a protocol number, and an Internet Protocol (IP) address of the first aggregated port, and wherein the information about the second aggregated port comprises a source port number, a destination port number, a protocol number, and an IP address of the second aggregated port.

6. The method according to claim 1, wherein the information about the first aggregated port comprises a loopback address of the second network device, a unidirectional label switched path (LSP) identifier (ID) of a unidirectional LSP from the first aggregated port to the second aggregated port, a unidirectional tunnel identifier of a unidirectional tunnel from the first aggregated port to the second aggregated port, and a loopback address of the first network device, and wherein the information about the second aggregated port comprises the loopback address of the first network device, a unidirectional LSP ID of a unidirectional LSP from the second aggregated port to the first aggregated port, a unidirectional tunnel identifier of a unidirectional tunnel from the second aggregated port to the first aggregated port, and the loopback address of the second network device.

7. The method according to claim 1, wherein the information about the first aggregated port comprises an Internet Protocol version 4 (IPv4) address of the first network device and an identifier and a type of a pseudo wire from the first aggregated port to the second aggregated port, and wherein the information about the second aggregated port comprises an IPv4 address of the second network device and an identifier and a type of a pseudo wire from the second aggregated port to the first aggregated port.

8. The method according to claim 1, wherein that the BFD session is up indicates that the BFD session is successfully established and that a connection between the first network device and the second network device is working.

9. A network device, wherein the network device is a first network device, wherein an aggregated link exists between a first aggregated port of the first network device and a second aggregated port of a second network device, wherein the first aggregated port comprises a first port and a second port, wherein the second aggregated port comprises a third port and a fourth port, and wherein the network device comprises:
a memory comprising instructions;
a processor coupled to the memory and configured to execute the instructions,
a transmitter coupled to the processor; and
a receiver coupled to the processor,
wherein the transmitter is configured to send, to the second network device, information used to establish at least two bidirectional forwarding detection (BFD) sessions, wherein the information comprises information about the first aggregated port, information about the second aggregated port, an identifier of the first port, a session identifier associated with the identifier of the first port, an identifier of the second port, and a session identifier associated with the identifier of the second port, wherein the session identifier associated with the identifier of the first port is used to identify a BFD session that is to be established on the first port, and wherein the session identifier associated with the identifier of the second port is used to identify a BFD session that is to be established on the second port,
wherein the memory is configured to store the information that is used to establish the at least two BFD sessions and sent to the second network device,
wherein the receiver is configured to receive information that is used to establish at least two BFD sessions and sent by the second network device, wherein the information sent by the second network device comprises the information about the second aggregated port, the information about the first aggregated port, an identifier of the third port, a session identifier associated with the identifier of the third port, an identifier of the fourth port, and a session identifier associated with the identifier of the fourth port, wherein the session identifier associated with the identifier of the third port is the same as the session identifier associated with the identifier of the first port, wherein the session identifier associated with the identifier of the fourth port is the same as the session identifier associated with the identifier of the second port, wherein the session identifier associated with the identifier of the third port is used to identify a BFD session that is to be established on the third port, and wherein the session identifier associated with the identifier of the fourth port is used to identify a BFD session that is to be established on the fourth port, and wherein the processor is configured to:
establish a BFD session between the first port and the third port and a BFD session between the second port and the fourth port according to the stored information and the information sent by the second network device;
determine whether at least one BFD session in the established BFD sessions is up; and
determine that the aggregated link is available when at least one BFD session in the established BFD sessions is up.

10. The network device according to claim 9, wherein the first network device comprises a first component and a second component that are replaceable, wherein the first port is on the first component, and wherein the second port is on the second component.

11. The network device according to claim 9, wherein the information about the first aggregated port comprises a source port number, a destination port number, a protocol number, and an Internet Protocol (IP) address of the first aggregated port, and wherein the information about the second aggregated port comprises an IP address of the second aggregated port.

12. The network device according to claim 9, wherein the information about the first aggregated port comprises a source port number, a destination port number, a protocol number, and an Internet Protocol (IP) address of the first aggregated port, and wherein the information about the second aggregated port comprises a source port number, a destination port number, a protocol number, and an IP address of the second aggregated port.

13. The network device according to claim 9, wherein the information about the first aggregated port comprises a loopback address of the second network device, a unidirectional label switched path (LSP) identifier (ID) of a unidirectional LSP from the first aggregated port to the second aggregated port, a unidirectional tunnel identifier of a unidirectional tunnel from the first aggregated port to the second aggregated port, and a loopback address of the first network device, and wherein the information about the second aggregated port comprises the loopback address of the first network device, a unidirectional LSP ID of a unidirectional LSP from the second aggregated port to the first aggregated port, a unidirectional tunnel identifier of a unidirectional tunnel from the second aggregated port to the first aggregated port, and the loopback address of the second network device.

14. The network device according to claim 9, wherein the information about the first aggregated port comprises an IPv4 address of the first network device and an identifier and a type of a pseudo wire between the first aggregated port and the second aggregated port; and the information about the second aggregated port comprises an Internet Protocol version 4 (IPv4) address of the second network device and an identifier and a type of a pseudo wire between the second aggregated port and the first aggregated port.

15. The network device according to claim 9, wherein that the BFD session is up indicates that the BFD session is successfully established and that a connection between the first network device and the second network device is working.

16. A system for performing bidirectional forwarding detection (BFD) on an aggregated link between a first network device and a second network device, wherein the system comprises:
the first network device; and
the second network device,
wherein the aggregated link exists between a first aggregated port of the first network device and a second aggregated port of a second network device,
wherein the first aggregated port comprises a first port and a second port,
wherein the second aggregated port comprises a third port and a fourth port,
wherein the first network device comprises:
a memory comprising instructions;
a processor coupled to the memory and configured to execute the instructions,
a transmitter coupled to the processor; and
a receiver coupled to the processor,
wherein the transmitter is configured to send, to the second network device, information used to establish at least two BFD sessions,
wherein the information comprises information about the first aggregated port,
information about the second aggregated port, an identifier of the first port, a session identifier associated with the identifier of the first port, an identifier of the second port, and a session identifier associated with the identifier of the second port,
wherein the session identifier associated with the identifier of the first port is used to identify a BFD session that is to be established on the first port,
wherein the session identifier associated with the identifier of the second port is used to identify a BFD session that is to be established on the second port,
wherein the memory is configured to store the information that is used to establish the at least two BFD sessions and sent to the second network device,
wherein the receiver is configured to receive information that is used to establish at least two BFD sessions and sent by the second network device,
wherein the information sent by the second network device comprises the information about the second aggregated port, the information about the first aggregated port, an identifier of the third port, a session identifier associated with the identifier of the third port, an identifier of the fourth port, and a session identifier associated with the identifier of the fourth port,
wherein the session identifier associated with the identifier of the third port is the same as the session identifier associated with the identifier of the first port,
wherein the session identifier associated with the identifier of the fourth port is the same as the session identifier associated with the identifier of the second port,
wherein the session identifier associated with the identifier of the third port is used to identify a BFD session that is to be established on the third port,
wherein the session identifier associated with the identifier of the fourth port is used to identify a BFD session that is to be established on the fourth port, and wherein the computer processor is configured to:
establish a BFD session between the first port and the third port and a BFD session between the second port and the fourth port according to the stored information and the information sent by the second network device;
determine whether at least one BFD session in the established BFD sessions is up; and
determine that the aggregated link is available when at least one BFD session in the established BFD sessions is up.

17. The method according to claim 3, wherein the information about the first aggregated port comprises a loopback address of the second network device, a unidirectional label switched path (LSP) identifier (ID) of a unidirectional LSP from the first aggregated port to the second aggregated port, a unidirectional tunnel identifier of a unidirectional tunnel from the first aggregated port to the second aggregated port, and a loopback address of the first network device, and wherein the information about the second aggregated port comprises the loopback address of the first network device, a unidirectional LSP ID of a unidirectional LSP from the second aggregated port to the first aggregated port, a unidirectional tunnel identifier of a unidirectional tunnel from the second aggregated port to the first aggregated port, and the loopback address of the second network device.

18. The method according to claim 3, wherein the information about the first aggregated port comprises an Internet Protocol version 4 (IPv4) address of the first network device and an identifier and a type of a pseudo wire from the first aggregated port to the second aggregated port, and wherein the information about the second aggregated port comprises an IPv4 address of the second network device and an identifier and a type of a pseudo wire from the second aggregated port to the first aggregated port.

19. The network device according to claim 10, wherein the information about the first aggregated port comprises a loopback address of the second network device, a unidirectional label switched path (LSP) identifier (ID) of a unidirectional LSP from the first aggregated port to the second aggregated port, a unidirectional tunnel identifier of a unidirectional tunnel from the first aggregated port to the second aggregated port, and a loopback address of the first network device, and wherein the information about the second aggregated port comprises the loopback address of the first network device, a unidirectional LSP ID of a unidirectional LSP from the second aggregated port to the first aggregated port, a unidirectional tunnel identifier of a unidirectional tunnel from the second aggregated port to the first aggregated port, and the loopback address of the second network device.

20. The network device according to claim 10, wherein the information about the first aggregated port comprises an IPv4 address of the first network device and an identifier and a type of a pseudo wire between the first aggregated port and the second aggregated port; and the information about the second aggregated port comprises an Internet Protocol version 4 (IPv4) address of the second network device and an identifier and a type of a pseudo wire between the second aggregated port and the first aggregated port.

* * * * *